United States Patent
Grey

(10) Patent No.: US 10,711,760 B2
(45) Date of Patent: Jul. 14, 2020

(54) WAVE ENERGY CONVERTER

(71) Applicant: AWS Ocean Energy Limited, Inverness (GB)

(72) Inventor: Simon Grey, Inverness (GB)

(73) Assignee: AWS Ocean Energy Limited, Inverness (GB)

(*) Notice: Subject to any disclaimer, the term of this patent is extended or adjusted under 35 U.S.C. 154(b) by 23 days.

(21) Appl. No.: 15/752,497

(22) PCT Filed: Aug. 12, 2016

(86) PCT No.: PCT/GB2016/052523
§ 371 (c)(1),
(2) Date: Feb. 13, 2018

(87) PCT Pub. No.: WO2017/025765
PCT Pub. Date: Feb. 16, 2017

(65) Prior Publication Data
US 2019/0010914 A1 Jan. 10, 2019

(30) Foreign Application Priority Data
Aug. 13, 2015 (GB) .................................. 1514418.1

(51) Int. Cl.
*F03B 13/18* (2006.01)
*F03B 13/14* (2006.01)
*F03B 13/26* (2006.01)

(52) U.S. Cl.
CPC ........ F03B 13/1845 (2013.01); F03B 13/148 (2013.01); F03B 13/266 (2013.01);
(Continued)

(58) Field of Classification Search
CPC .................................. F03B 13/148; F03B 13/266; F03B 13/12–26; F05B 2240/97; Y02E 10/38
See application file for complete search history.

(56) References Cited

U.S. PATENT DOCUMENTS 3,930,168 A * 12/1975 Tornabene .......... F03B 13/1845
290/53
6,772,592 B2 * 8/2004 Gerber ................ F03B 13/1845
290/53
(Continued)

FOREIGN PATENT DOCUMENTS

EP 2171263 A2 4/2010
EP 2171263 B1 * 5/2016 ............ F03B 13/148
(Continued)

OTHER PUBLICATIONS

EP-2171263-B1, John Fitzgerald, May 18, 2016.*
(Continued)

*Primary Examiner* — Jesse S Bogue
(74) *Attorney, Agent, or Firm* — Alston & Bird LLP

(57) ABSTRACT

A wave operated assembly (20) configured to be submerged in a body of water (12), the wave operated assembly (20) comprising a wave actuated member (24), a second portion and a piston assembly, pressure chamber (22) or spring coupled between the wave actuated member (24) and the second portion. The wave actuated member (24) and the fixed portion each define part of a first chamber (22) or volume comprising or configured to receive a fluid. A lower portion of the wave actuated member (24) at least partly defines a free surface (35) between the fluid within the first chamber (22) or volume and the body of water (12). The wave actuated member (24) is movable relative to the second portion. The piston assembly, pressure chamber (22) or spring is configured to apply a force on the wave actuated member (24) that works in opposition to a force on the wave actuated member (24) due to the fluid in the first chamber (22) or volume.

21 Claims, 3 Drawing Sheets

(52) U.S. Cl.
CPC ..... *F05B 2220/706* (2013.01); *F05B 2240/97* (2013.01); *Y02E 10/38* (2013.01)

(56) References Cited

U.S. PATENT DOCUMENTS

| | | | |
|---|---|---|---|
| 7,632,041 B2* | 12/2009 | Jean | E02B 9/08 |
| | | | 405/76 |
| 8,348,636 B2* | 1/2013 | Spidell | F03B 13/1845 |
| | | | 290/53 |
| 8,581,432 B2* | 11/2013 | Rohrer | F03B 13/1815 |
| | | | 290/42 |
| 2010/0308589 A1 | 12/2010 | Rohrer | |
| 2010/0327595 A1* | 12/2010 | Gottler | F03B 13/1845 |
| | | | 290/53 |
| 2014/0145444 A1 | 5/2014 | Park et al. | |

FOREIGN PATENT DOCUMENTS

| | | | |
|---|---|---|---|
| WO | WO 1999/11926 A1 | 3/1999 | |
| WO | WO 2006/109024 A1 | 10/2006 | |
| WO | WO-2008149084 A2 * | 12/2008 | ............ F03B 13/148 |

OTHER PUBLICATIONS

The International Searching Authority of WIPO, International Preliminary Report on Patentability (Chapter I) for International Application No. PCT/GB2016/052523, dated Feb. 22, 2018, 8 pages, Switzerland.

International Searching Authority, International Search Report and Written Opinion for International Application No. PCT/GB2016/052523, dated Nov. 21, 2016, 11 pages, European Patent Office, Netherlands.

* cited by examiner

WAVE ENERGY CONVERTER

CROSS REFERENCE TO RELATED APPLICATIONS

This application is a National Stage Application, filed under 35 U.S.C. § 371, of International Application No. PCT/GB2016/052523, filed Aug. 12, 2016, which claims priority to United Kingdom Application No. 1514418.1, filed Aug. 13, 2015; the contents of both of which as are hereby incorporated by reference in their entirety.

BACKGROUND

Related Field

The present invention relates to an apparatus for converting energy from waves in a body of water.

Description of Related Art

Significant efforts are being made within the energy industry to provide viable methods of extracting energy from renewable sources, such as from waves. Numerous designs of wave energy apparatus have been proposed and range from floating or heaving devices to devices which in use are fully submerged.

A basic example of a simple wave responsive buoyant system is an Archimedes floater. In use, the Archimedes floater is submerged under the surface of a water body. The Archimedes floater comprises an inverted chamber that encloses a gas or other buoyant fluid and is open at a lower end such that it forms a free surface between the gas and the water. The buoyancy force (equal to the displaced volume of the floater structure plus the volume of gas enclosed in the inverted chamber) is balanced by the mass of the floater. Since the lower part of the inverted chamber is open, the pressure of gas inside the chamber is equal to the water pressure at the depth of the free surface. If the floater is submerged further, the free surface also moves downward to a new, greater depth. This increases the pressure and hence the volume of the gas or other buoyant fluid is reduced or compressed. As such, the buoyancy of the floater also reduces.

An example of a wave energy apparatus is described in WO 2006/109024 describes a float-type arrangement in which one or more floating members are suspended from a support structure over a body of water such that heaving motion of the floating members by wave action is used for power generation.

A device for wave energy conversion incorporating a submerged system is disclosed in WO 99/11926 which is based on the hydrodynamic principle that the ambient water pressure in a region below a passing wave varies. In this prior art arrangement the device comprises an air filled container formed of a lower part which is fixed relative to the seabed and an upper part which is displaceable in a vertical direction relative to the lower part. As such, relative movement of the upper and lower parts varies the working gas volume of the container. In use, the upper part is caused to be displaced in a vertical direction in response to differences between the external water pressure and internal air pressure, wherein the relative movement of the parts of the container is exploited as useful work to drive a linear generator.

More specifically, when the described prior art device is in an equilibrium position the ambient water pressure (and the weight of the upper part of the container) will be balanced by the internal air pressure within the container. An approaching wave crest will result in a local increase in water pressure and thus create a pressure imbalance which drives the upper part of the container downwards, reducing the air volume until the air pressure is equalized with the external water pressure. An approaching wave trough, on the other hand, results in a local decrease in water pressure which causes the upper part of the container to be driven upwards by the internal air pressure to again achieve equilibrium.

It is well documented that submerged devices operating in the manner described above can absorb wave energy most effectively when operated in wave periods close to the natural frequency of the device, i.e., when operated at resonant frequencies. In WO 99/11926, the air enclosed within the container forms a spring and the upper part provides corresponding mass to thus establish a resonant system, wherein a ballast arrangement is provided for varying the internal volume of the container (and thus spring constant) to tune the natural frequency of the system to the predominant wave frequency. The ballast arrangement utilises pumps to vary a water level within the container to change the working volume of the enclosed air.

In known systems of the type described above the structure is such that a low pressure gas spring is established which therefore necessitates a large volume in order to achieve the required spring constant. Gas pressures of around 2 to 3 bar are typical. This requires the provision of very large structures to contain the gas volume which creates problems in terms of handling, anchoring, bearing arrangements, exposure to very large in-situ loading, and the like. Additionally, it is recognised that the useful volume in terms of energy capture is the actual swept volume, which in known arrangements is significantly less than the entire air volume. The additional volume is not fundamentally required to absorb wave power and is required only to provide the required spring constant for resonant operation.

Furthermore, in known arrangements the upper floating component of the container is required to be heavy in order to provide the required working volume air pressure such that the water pressure does not result in flooding of the working volume. However, this results in a high inertia oscillator which will therefore have a narrow-banded response characteristic, which implies that known devices will not respond well to broad-banded sea-spectra which often occur.

It is among the objects of the present invention to obviate or at least mitigate one or more of the above noted and other problems in the prior art.

BRIEF SUMMARY

At least one aspect of the present invention is defined by the independent claims appended hereto. Preferred features of the present invention are defined by the dependent claims appended hereto.

According to a first aspect of the present invention there is provided an apparatus for converting energy from wave motion in water. The apparatus may be configured for submersion or immersion in a body of water. The apparatus may comprise a wave operated assembly.

The wave operated assembly may comprise a wave actuated member. The wave operated assembly, e.g. the wave actuated member, may at least partially define or comprise a first chamber or volume. The first chamber or volume may comprise or be configured to receive or contain a fluid, e.g.

a gas such as air. The wave actuated member may be configured to be movable, e.g. at least partially or wholly in a vertical direction, in use. The volume of the first chamber or volume may vary with the position of the wave actuated member.

The wave operated assembly may comprise a second portion. The wave operated assembly may comprise a piston assembly, pressure chamber or spring, which may be coupled between the wave actuated member and the second portion.

The wave actuated member and the fixed portion may each define part of the first chamber or volume comprising or configured to receive a fluid. The wave actuated member may be movable relative to the second portion.

The piston assembly, pressure chamber or spring may be configured to apply a force on the wave actuated member that works in opposition to a force on the wave actuated member due to the fluid in the first chamber or volume. The force applied to the wave actuated member by the piston assembly, pressure chamber or spring and the force on the wave actuated member due to the fluid in the first chamber or volume may both vary with the position of the wave actuated member relative to the second portion.

The piston assembly, pressure chamber or spring may be configured such that as force on the wave actuated member due to the fluid in the first chamber or volume respectively increases or decreases, the opposing force exerted by the piston assembly piston assembly, pressure chamber or spring on the wave actuated member also respectively increases or decreases.

The force on the wave actuated member due to the fluid in the first chamber or volume may be a buoyant or upwards force or a force towards a surface of the body of water. The piston assembly, pressure chamber or spring may be configured to apply a force on the wave actuated member that opposes buoyancy of, and/or opposes a floating, raising or upward motion of, the wave actuated member. The piston assembly, pressure chamber or spring may be configured to apply a sinking or downwards force on the wave actuated member or a force acting away from the surface of the body of water.

The piston assembly, pressure chamber or spring may be configured or configurable such that the force exerted by the piston assembly, pressure chamber or spring on the wave actuated member balances buoyant forces experienced by the wave actuated member and/or a floating, raising or upward motion of the wave actuated member in an equilibrium position of the wave actuated member relative to the second member. The equilibrium position may vary with wave height of the body of water or water head or pressure on the wave operated assembly.

The second portion may be a fixed portion that is fixed or configured to be fixed to a bed or support.

The second portion may be a mooring or fixed portion. The second portion may be attached, fixed or restrained, or configured to be attached, fixed or restrained relative to a bed, e.g. sea bed or river bed, of the body of water or to a support or other structure. The wave actuated member may be movable relative to the second portion.

The wave actuated member, e.g. a lower portion of the wave actuated member, may be open and/or comprise or at least partly define a free surface, boundary or interface between the fluid, e.g. the gas or air within the volume and the water, e.g. the body of water.

The first chamber or volume may be defined by at least two parts, wherein at least one of the parts may be movable relative to another one of the parts. One of the parts may be movable. One of the parts may be or comprise or be comprised in or coupled to the wave actuated member. Another of the parts may be the second portion. The other of the parts (e.g. the second portion) may be fixed.

The wave operated assembly, e.g. the wave actuated member, may comprise at least one first vessel, container or receptacle, such as an inverted vessel, container or receptacle. The at least one first vessel, container or receptacle may be or comprise at least one of the parts defining the first chamber or volume. The at least one first vessel, container or receptacle may be least partially open, e.g. at a lower or lowermost end thereof, which may at least partially or wholly define the free surface, boundary or interface. The at least one first vessel, container, or receptacle may define or comprise at least part of the first chamber or volume. The at least one first vessel, container or receptacle may be movable, e.g. as part of or with the wave actuated member. The first vessel, container or receptacle may comprise at least a top and at least one side wall. The top and the at least one side wall may be sealed or integral with each other. The first vessel, container or receptacle may comprise a cylindrical member. The first vessel, container or receptacle may be closed at the top, upper or upmost end and/or open at the bottom, lower or lowermost end.

The wave operated assembly may comprise at least one second vessel, container or receptacle. The at least one second vessel, container or receptacle may be or comprise the at least one other of the parts defining the first chamber or volume. The at least one second vessel, container or receptacle may be fixed and/or movable relative to the first vessel, container or receptacle. The at least one second vessel, container or receptacle may be fixed to, or in relation to, the bed, e.g. sea bed or river bed, of the body of water and/or in relation to the mooring or fixing portion of the wave operated assembly. The at least one second vessel, container or receptacle may be in communication with, open to and/or at least partially define the first chamber or volume. The at least one second vessel, container or receptacle may be open, e.g. open at a top, upper or upmost end thereof. The open portion, e.g. the top, upper or upmost end, of the at least one second vessel, container or receptacle may be provided within the at least one first vessel, container or receptacle, e.g. over at least some or all of the range of motion of the at least one first vessel, container or receptacle.

The free surface, boundary or interface may be defined between the second vessel, container or receptacle and the first vessel, container or receptacle, e.g. between an outer wall or surface of the second vessel, container or receptacle and an inner wall or surface of the first vessel, container or receptacle.

The piston assembly, pressure chamber or spring, may be or comprise a pneumatic spring. The piston assembly, pressure chamber or spring may be coupled with or connected to the wave actuated member. The piston assembly, pressure chamber or spring may be coupled between the first vessel, container or receptacle and the second vessel, container or receptacle or the mooring portion. The piston assembly, pressure chamber or spring may be configured to apply a force on the wave actuated member, such as a force opposing buoyancy of, and/or opposing a floating, raising or upward motion of the wave actuated member. The force applied by the piston assembly, pressure chamber or spring on the wave actuated member may be in the same direction as the action of gravity on the wave actuated member and/or in the direction of a sinking or lowering motion of the wave actuated member. The pressure chamber may be configured such that, as the wave actuated member sinks or lowers in the body of water, the volume of the pressure chamber reduces and/or the pressure in the pressure chamber changes, e.g. increases. The pressure chamber may be configured such that, as the wave actuated member sinks or lowers in the body of water, the force applied by the pressure chamber on the wave actuated member reduces.

The piston assembly, pressure chamber or spring may comprise at least a first part and a second part. At least a first part of the piston assembly, pressure chamber or spring may be movable relative to the second part. The first part of the piston assembly, pressure chamber or spring may be movable. The first part of the piston assembly, pressure chamber or spring may be fixed to, integral or coupled with the wave actuated member and/or the first vessel, container or receptacle, e.g. for movement therewith. The second part of the piston assembly, pressure chamber or spring may be fixed. The second part of the piston assembly, pressure chamber or spring may be fixed to, integral or coupled with the second vessel, container or receptacle and/or the mooring or fixing portion. The first part of the piston assembly, pressure chamber or spring may be sealed to the second part of the pressure chamber or spring, e.g. by using a rolling or sliding seal, a rolling membrane seal, a bellows seal and/or the like. The piston assembly, pressure chamber or spring may be telescopic, e.g. one of the first or second part of the piston assembly, pressure chamber or spring may be movable and/or receivable within the other of the first or second part of the pressure chamber or spring. The piston assembly, pressure chamber or spring may define an enclosed or enclosable, e.g. a sealed or entirely enclosed or enclosable, volume, e.g. within the pressure chamber or spring. The enclosed or enclosable volume defined by the piston assembly, pressure chamber or spring may be a second chamber or volume. The enclosed or enclosable volume of the piston assembly, pressure chamber or spring may be at vacuum or partial vacuum, e.g. over at least some or all of an operational range of the wave operated assembly. The enclosed or enclosable volume of the piston assembly, pressure chamber or spring may be at a pressure lower than or higher than atmospheric pressure, e.g. over at least some or all of an operational range of the wave operated assembly.

The second chamber or volume and the first chamber or volume may work in opposition, e.g. to provide opposing forces on the wave actuated member, which may at least partly balance out spring effects, and may provide a very soft spring. In other words, the first chamber or volume and the second chamber or volume may work in balance, e.g. to produce a soft spring.

The piston assembly, pressure chamber or spring may be at least partially or wholly provided within the first chamber or volume and/or within the wave actuated member and/or at least partially or wholly within the first and/or second vessel, container or receptacle. The wave actuated member and/or the first vessel, container or receptacle may be coupled to the mooring or fixing portion and/or the second vessel, container or receptacle via the pressure chamber or spring.

The pressure chamber or spring, e.g. an outer surface of the pressure chamber or spring, may at least partially define the first chamber or volume. The piston assembly, pressure chamber or spring may be concentric with the first and/or second vessel, container or receptacle. An outer diameter of the piston assembly, pressure chamber or spring may be less than an outer diameter of the wave actuated member, e.g. the first vessel, container or receptacle. The outer diameter of the piston assembly, pressure chamber or spring may be between 50% and 75% less than an outer diameter of the wave actuated member, e.g. the first vessel, container or receptacle.

At least part or all of an outer diameter of the piston assembly, pressure chamber or spring may comprise a varying outer diameter, e.g. a continuously varying outer diameter, such as a sloping or conical surface.

The wave operated apparatus may comprise a motion control or tuning assembly. The motion control or tuning assembly may comprise a tuning volume, which may be or comprise a third chamber or volume. The tuning volume may be enclosed within a tuning chamber. The tuning volume may contain or comprise a fluid, such as a gas, which may be pressurised, or evacuated or comprise a partial vacuum or vacuum, and/or be at a same, different or higher or lower pressure than at least one of the first and/or second chambers or volumes, e.g. over at least some or all of their operational ranges. The tuning or third chamber or volume may be comprised in the mooring or fixing portion, e.g. in an upper portion thereof. The tuning or third chamber or volume may be in communication, e.g. free or selective communication, with the first and/or second chambers or volumes, e.g. via a passage, valve, choke or constriction, such as a throttle valve or motorised valve. The valve or constriction may be active and/or passive. The motion control or tuning assembly may be configured to provide or selectively provide additional compressibility to the fluid in the first or second chambers or volumes.

The tuning volume may comprise a fourth chamber or volume. The fourth chamber or volume may be provided in a lower portion of the mooring or fixing portion. The fourth chamber or volume may comprise or be configured to contain a fluid, such as a gas. The fourth chamber or volume may be in communication or selective communication with the third chamber or volume, e.g. via a valve, choke, constriction and/or the like, such as a pump, throttle valve or motorised valve. The motion control or tuning assembly may be configured to vary the volume and/or pressure of fluid in the third chamber or volume and/or thereby the volume and/or pressure of fluid in the first and/or second chambers or volumes by selectively operating or varying the valve, choke or constriction and/or selectively supplying fluid from the fourth chamber or volume to the third chamber or volume and/or varying communication between the fourth and third chambers or volumes and/or between the third and first or second chambers or volumes.

The motion control or tuning assembly may be active, e.g. comprising and/or responsive to a controller, such as an electronic control unit, and/or the motion control or tuning assembly may be passive.

The wave operated assembly may comprise or be coupled or couplable to a power take off assembly, such as a generator, pump and/or the like. The power take off assembly may be operable by or responsive to motion of the wave actuated member.

Preferably, the apparatus may be adapted to be at least partially submerged within a body of water. In embodiments of the invention the entire apparatus may be adapted to be submerged.

Preferably, the wave actuated member may be adapted to be exposed to ambient conditions below a surface level of a body of water such that ambient water pressure variations will effect movement of said wave actuated member. Accordingly, in use, displacement of the wave actuated member by changes in ambient water pressure may advantageously operate the power take off assembly to produce a useful energy output.

The wave actuated member may be adapted to be displaced in a single dimension. In alternative embodiments the wave actuated member may be displaceable in multiple dimensions.

Advantageously, at least a portion of a wall structure of the first and/or second vessel, container or receptacle and/or the first and/or second parts of the piston assembly, pressure chamber or spring may be rigid. Alternatively, or additionally, at least a portion of the wall structure of the first and/or second vessel, container or receptacle and/or the first and/or second parts of the piston assembly, pressure chamber or spring may be flexible. The wall structure may comprise a plastic material, elastic material, a composite or fibre reinforced plastic material or the like, or any suitable combination thereof.

The pressure of the volume of gas held under the wave actuated member or in the first and/or second vessel, container or receptacle and/or the first and/or second parts of the piston assembly, pressure chamber or spring may be above or below atmospheric pressure.

The gas may comprise nitrogen, air or the like.

The controller may be adapted to receive input signals providing data relating to the state of the apparatus, such as the position, velocity, acceleration or the like of the wave activated and displaceable members, and utilise this data to control the drive means in the desired manner. The controller may comprise a control algorithm adapted to manipulate input data to provide the desired controlled output of the valve, pump or choke.

In prior art arrangements the upper floater is required to have a certain minimum mass to ensure a certain gas pressure is achieved. However, in the present invention, the elimination of a substantial and heavy upper float member not only minimises structural volume but also reduces the inertia of the apparatus such that the apparatus may be responsive to a broader frequency range or band.

The power take off assembly may be mechanically operated, hydraulically operated, pneumatically operated or the like, or any suitable combination thereof.

The power take off assembly may be adapted to generate electricity. Alternatively, or additionally, the power take off assembly may be adapted to pressurise a fluid and/or provide a motive force for a solid object or a fluid. For example, the power take off assembly may comprise a pump adapted to pump a fluid, such as sea water or the like. This arrangement may advantageously be used in a number of applications, such as pumping seawater into a downhole formation, such as a hydrocarbon bearing formation to displace formation fluids.

In embodiments of the present invention the power take off assembly may be adapted to be directly driven by reciprocating motion of the wave actuated member. For example, the power take off assembly may comprise an electrical linear generator or the like.

Alternatively, or additionally, the power take off assembly may be adapted to pressurise a fluid to be used directly, for example in a pumping application as noted above. Alternatively, or additionally, the pressurised fluid may be used indirectly, for example to drive a mechanical assembly, such as a hydraulic motor, turbine or the like to provide rotational shaft work. The rotational shaft work may be utilised to drive an electric generator, for example.

In one embodiment, the power take off assembly may comprise a piston assembly incorporating a piston slidably mounted within a cylinder, wherein the piston is coupled to the wave actuated member to move therewith. Advantageously, a fluid may be provided within the cylinder such that motion of the piston will cause fluid to be displaced to and from the cylinder. The power take off assembly may further comprise an external mechanical assembly, such as a hydraulic motor, adapted to be driven by fluid displaced from the cylinder. In one embodiment a single acting piston assembly may be provided. Alternatively, or additionally, a double acting cylinder may be provided.

A power take off assembly incorporating a piston assembly as described above may form part of the motion control device, wherein the displaceable member of the motion control assembly defines a piston of the power take off assembly.

The power take off assembly may form part of a dynamically controlled hydraulic spring, wherein the hydraulic motors may be selectively utilised as pumps to control the rate of fluid exchange with the cylinder. In this arrangement the power take off assembly may comprise a power source, such as grid electricity, a flywheel, a charged accumulator or the like for driving the hydraulic motors.

The power take off assembly may comprise a plurality of piston assemblies. This arrangement may provide a degree of redundancy and may assist to achieve higher efficiency. That is, under moderate operating conditions, some piston assemblies may be rendered idle or non-operational such that power is absorbed using fewer piston assemblies for improved efficiency.

The power take off assembly may be at least partially located externally of the working chamber of the wave activated assembly. Alternatively, or additionally, the power take off assembly may be at least partially located internally of the working chamber.

Advantageously, the apparatus of the present invention may comprise inertia compensation means adapted to compensate for inertia within the apparatus. The inertia compensation means may advantageously reduce the inertia of the apparatus and thus improve the dynamic response of the apparatus. The inertia compensation means may be associated with the power take off assembly and may be adapted to cause the apparatus to dynamically behave as though it is lighter and as such improve the dynamic response. Preferably, a control algorithm is associated with the inertia compensation means and the required forces applied to the apparatus to cause changes in the effective inertia of the apparatus may be delivered through the power take off assembly.

Advantageously, the apparatus may further comprise a stroke control algorithm adapted to ensure that the wave actuated member does not exceed a predefined stroke limit, which would otherwise potentially cause damage to the apparatus. This algorithm may comprise a number of inputs, such as member position, velocity, acceleration or the like and utilise such inputs to calculate or determine the total mechanical energy in the apparatus (both kinetic and potential). This calculated value may be compared to a reference maximum mechanical energy that would result in the stroke exceeding maximum values. The algorithm may therefore be adapted to establish the rate of change of mechanical energy within the apparatus. The algorithm may also be adapted to request an appropriate braking force to be applied, for example utilising the power take off assembly to apply a force on the apparatus, as described above. The control system established by applying the algorithm advantageously feeds back the mechanical energy and rate of change of energy and is not restricted to only position and velocity as a control basis. Such a control arrangement as described herein requires no future knowledge to implement and the braking can be achieved regeneratively such that the power generated may be utilised.

BRIEF DESCRIPTION OF THE FIGURES

These and other aspects of the present invention will now be described, by way of example only, with reference to the accompanying drawings, in which.

DETAILED DESCRIPTION OF VARIOUS EMBODIMENTS

Figure 1:
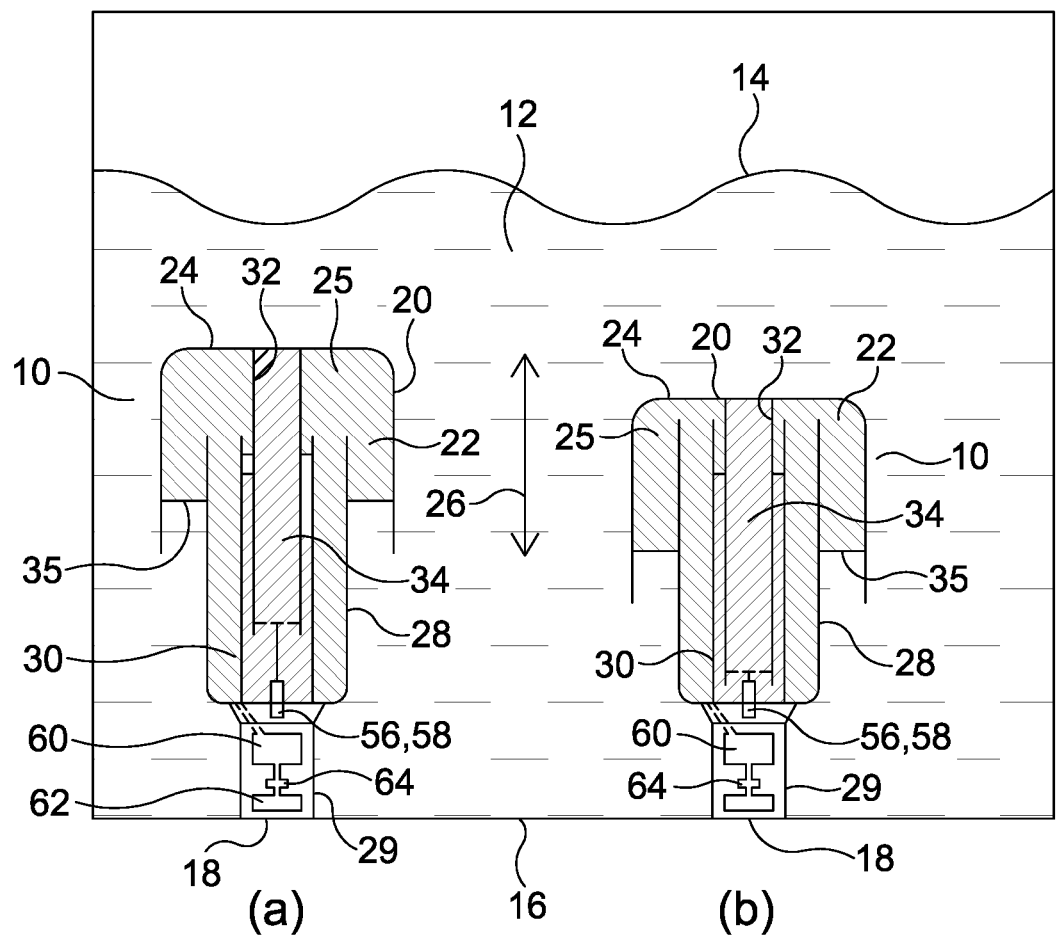
FIG. 1(a) and FIG. 1(b) are diagrammatic representations of an apparatus for converting energy from wave motion in water in accordance with an embodiment of the present invention in (a) an expanded or raised state and (b) in a contracted or lowered state.
Figure 2:
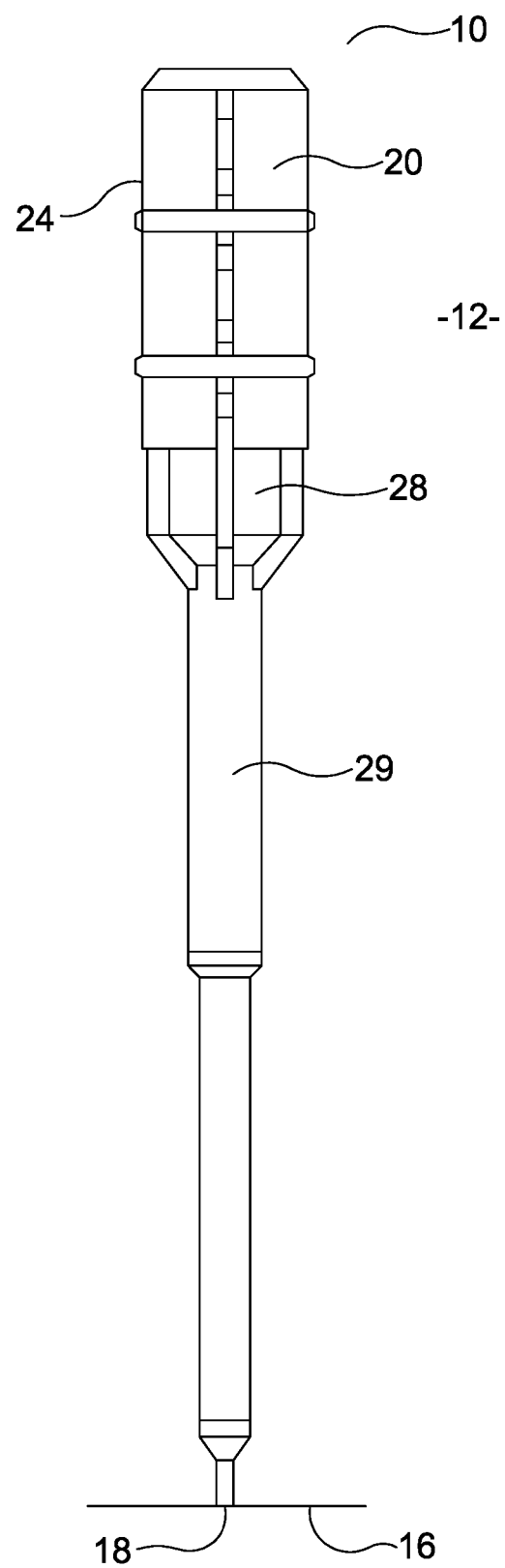
FIG. 2 is a side profile view of the apparatus of FIGS. 1(a) and 1(b)
Figure 3:
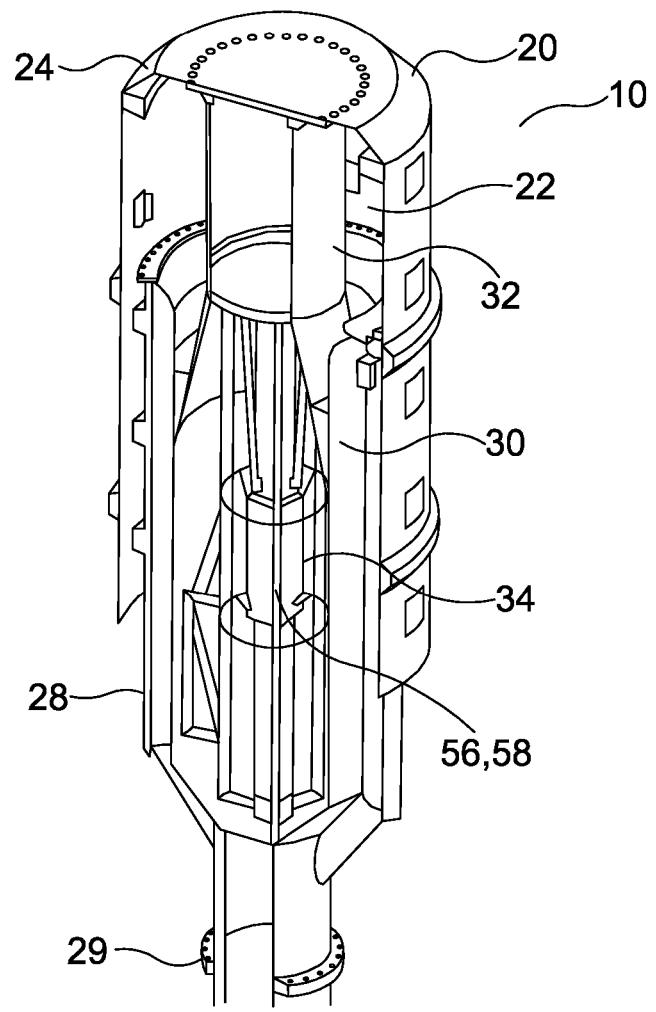
FIG. 3 is a perspective cut-away view of the apparatus of FIGS. 1(a) and 1(b).

Reference is first made to FIGS. 1(a), 1(b), 2 and 3 of the drawings in which there is shown a diagrammatic representation of an apparatus for converting energy from wave motion in water in accordance with an embodiment of the present invention. The apparatus, generally identified by reference numeral 10, in use, is adapted to be submerged within a body of water 12 which experiences surface waves 14. The apparatus 10 is mounted on the seabed 16 via a suitable anchor 18.

The apparatus 10 includes a wave operated assembly 20 which comprises a chamber 22 and a wave actuated member 24 which is in the form of a hollow inverted cup or container that defines the upper and at least part of the side wall portion of said chamber 22. In use, and as described in further detail below, the wave actuated member 24 is adapted to be displaced or reciprocated in the direction of arrow 26 in response to wave motion to vary the volume of the chamber 22. At least part of the chamber 22 contains a gas 25, such as air.

In the embodiment shown in FIG. 1, the wave operated assembly 20 further comprises a hollow cup shaped reference member 28 in the form of a cylinder which is fixed relative to the seabed 16 via a rigid mooring leg 29, and optionally via a flexible or pivoting joint or mooring and/or a flexible or pressure compensated tether. The upper part of the reference member 28 extends inside the wave actuated member 24 and is open at an upper part thereof so as to be in fluid communication therewith. In this way, the reference member 28 defines part of the chamber 22 and can receive the gas 25 therein.

A radial gap is formed between overlapping side portions of the wave actuated member 24 and the reference member 28. An annular free surface 35 that defines an interface between the gas in the chamber 22 and the body of water is defined between the inner side surface of the wave actuated member 24 and the overlapping portion of the outer side surface of the reference member 28.

A hollow cylindrical displaceable member 32, which partially defines a sealed inner volume 34 is disposed inside the wave actuated member 24. An upper part of the displaceable member 32 is coupled or integral with the wave actuated member and is closed. In this way, the displaceable member 32 may be movable with the wave actuated member 24.

A hollow cylindrical fixed body 30 is fixed or integral with a lower surface of the reference member 28. The lowest end of the displaceable member 32 is open and a lower portion of the displaceable member 32 is received within, and movable with respect to, the fixed body 30. In particular, the displaceable member 32 is received through an opening at the top of the fixed body 30. A seal, such as a rolling or sliding seal is provided between the displaceable member 32 and the fixed body 30. In this way, the displaceable member 32 and the fixed body 30 define the sealed inner volume 34. Accordingly, the wave operated assembly 20 may be further defined as a piston assembly. The sealed inner volume 34 is preferably at less than atmospheric pressure, e.g. a vacuum or partial vacuum, but in other embodiments may be provided at greater than atmospheric pressure.

Outer surfaces of the fixed body 30 and the displaceable member 32 and inner surfaces of the wave actuated member 24 and the reference member 28 define the chamber 22. Advantageously, at least part of the outer surfaces of the displaceable member 32 can vary or continuously vary in outer diameter, e.g. in a sloping or cone shaped arrangement. In this way, the free-surface 35 below the wave actuated member 24 can change as the free-surface moves vertically.

By the above arrangement, the piston assembly formed by the fixed body 30 and the displaceable member 32 resists expansion thereof and thereby acts against the buoyancy of the wave operated assembly 20 containing the gas 25 in the chamber 22. The cross sectional area of the piston assembly formed by the fixed body 30 and the displaceable member 32 relative to the cross sectional area of the chamber 22/wave actuated member 24 is selected so that the contractive force generated by the piston assembly balances the buoyant forces experienced by the wave actuated member 24, thus eliminating the need for additional mass.

In use, a wave crest will result in an increasing ambient water pressure and thus an increasing force being applied to the volume of gas 25 held under the wave actuated member 24. The volume of gas 25 will compress, reducing buoyancy and resulting in the wave actuated member 24 sinking. However, the lower part of the chamber 22 is fixed by the reference member 28. This results in a "hydrostatic gearing" effect that provides a soft positive spring that acts against the sinking of the wave actuated member 24, without requiring a large gas volume and is capable of down-sizing. In other words, the compression of the gas 25 by the sinking of the wave actuated member 24 increases the pressure applied by the gas 25 between the fixed reference member 28 and the wave actuated member 24 in order to resist sinking of the wave actuated member 24.

However, as the wave actuated member moves downwards, so does the displaceable member 32, thereby reducing the volume of the sealed inner volume 34, reducing the contractive force generated by the piston assembly (i.e. by the pressure, vacuum or partial vacuum in the inner volume 34), which thus reduces the downward force on the wave actuated member 24 applied by the piston assembly/inner volume 34.

In this way, by selection of appropriate areas, volumes and pressures of the chamber 22 and the inner volume 34, a well-balanced system that has low mass and a tune-able spring can be formed without the cost and complexity of mechanical spring systems.

Optionally the chamber 22 can be in fluid communication with a further compartment 60, e.g. in an upper part of the mooring leg 29. This further compartment 60 is operable as a tuning volume and can be used to tune performance by providing additional compressibility of the gas 25.

A fourth volume or chamber 62 is optionally provided in a lower part of the mooring leg 29. The fourth volume or chamber 62 is in selective fluid communication via a controlled or controllable mechanism 64, such as a pump or valve or the like, with the further compartment 60. The fourth volume or chamber 62 contains additional gas that can be selectively provided to the further compartment 60 and thereby to the chamber 22 in order to vary or tune the spring constant of the apparatus 10.

An approaching wave trough, on the other hand, will be associated with a decreasing ambient water pressure and thus an increase in volume of the gas 25 and thereby buoyancy of the wave actuated member 24. This will therefore establish a force imbalance in that the force applied on the wave actuated member 24 by the gas 25 in the chamber 22 will effect upward movement of the wave actuated member 24 and thereby the displaceable member 32. This will increase the volume of the inner volume 34, reducing the pressure inside, and increasing the contractive force exerted by the inner volume 34 until a force equilibrium is achieved.

Accordingly, cyclic variations in local ambient water pressure caused by passing surface waves will result in reciprocating motion of the wave actuated member 24 and associated expansion and contraction of the inner volume 34, wherein such reciprocating motion may be utilised as useful work, as described below.

The apparatus 10 further comprises a power take-off assembly 56 which comprises, for example, hydraulic motors 58 or one or more electric generators (not shown) or the like. The power take-off assembly is operable by the reciprocating motion of the wave actuated member 24. Advantageously, the power take off can be configured to resist any unbalanced forces caused by wave induced disturbances and convert these forces into useful energy or work. Advantageously, the power take off can be a linear power take off, such as a linear generator or motor, which is optionally at least partially located inside the inner volume 34 and/or in the mooring leg 29 and which can be coupled with or operable by the wave actuated member 24 and/or by the displaceable member 32.

The present invention as described in the exemplary embodiments above has significant advantages over previously proposed systems. For example, the present invention provides an apparatus which is significantly lighter than known arrangements and as such is capable of having a broader response range in view of the reduced inertia. Additionally, the structural volume of the apparatus can be made significantly smaller than known systems, if so desired.

The present system can also eliminate expensive high pressure gas springs. Since the wave actuated member 24 may be mounted to the fixed part of the system, e.g. the mooring leg 29, via the piston assembly comprising the fixed body 30 and the displaceable member 32, drag prone external bearings can be avoided. Furthermore, the present invention may allow a smaller internal evacuated volume, due to a reduction in equipment required. The mass of the wave actuated member 24 required to counter the buoyancy of the system may be reduced. In addition, since the chamber 22 can be coupled with additional volume in the hollow mooring leg 29, the area of the free surface 35 may be minimised, which may in turn minimise secondary radiating of waves from the free surface, thereby increasing the effectiveness of the system as a wave power absorber. In addition, with the present invention, the utilisation of volume may be improved, which may improve the specific cost of the system.

It should be understood that the embodiments described above are merely exemplary and that various modifications may be made thereto without departing from the scope of the invention. For example, the wave actuated members and displaceable members may be mounted in any suitable relative orientation, such as side-by-side. Additionally, the disclosed apparatus may be utilised in an inverted position. Furthermore, any suitable sealing arrangement may be utilised between the wave actuated member and fixed member of the wave actuated assembly. Additionally, the various features and arrangements presented in a single described embodiment may be utilised in other embodiments.

Various embodiments of the present invention may comprise one or more of the following features:

An inverted canister (the 'Floater' or wave actuated member) enclosing a volume of gas, that volume having a lower free-surface, said canister being submerged in a body of water and free to move generally vertically subject to the constraints of a power take-off system; and/or An inner telescopic canister (the 'Silo' or piston assembly), concentric with the Floater and which may be 50% to 75% of the diameter of the Floater, comprised of two parts (the fixed body and the displaceable member) separated by a rolling or sliding seal with the interior being at least partially evacuated. The upper part of said Silo being connected to the Floater and the lower part of the Silo being restrained e.g. by a mooring system; and/or The respective Floater and Silo volumes being arranged such that the buoyancy force exerted by the submerged gas within the floater is resisted adequately by the contraction force exerted by the vacuum within the Silo, this removing the need for additional mass; and/or Advantageously, the outer profile of the Silo is arranged with varying diameter such that the free-surface area of the gas contained below the Floater (said area being defined by the inner Floater diameter and the outer Silo diameter at a particular elevation) may change as the free-surface moves vertically; and/or Advantageously, a third chamber or volume (the 'Tuning Volume'), probably provided within the structural mooring leg, in fluid connection with the Floater gas volume so as to provide additional compressibility to the Floater gas; and/or Further advantageously, a fourth volume, probably located in the lower portion of the mooring leg, so as to provide a storage space for clean fluid which can be pumped into the Tuning Volume so as to vary the volume thereof, thus affecting the spring constant of the device; and/or A power take-off system capable of resisting the unbalanced forces caused by wave-induced disturbances in the hydrostatic pressure surrounding the device and converting these forces into useful energy.

This concept essentially fixes part of the lower boundary of the gas volume whilst allowing part of the boundary to move as the floater moves. This produces a 'hydrostatic gearing' effect whereby a soft positive spring is achievable without requiring either a large gas volume or an evacuated interior. The concept is capable of down-scaling to sizes suited to lower-cost prototyping and early pre-commercial markets.

An embodiment of the present invention comprises a combination of hydrostatic gearing and evacuated interior to achieve the following:

Reduction of floater mass back to minimum structural mass (which can be minimised by using high-strength composite materials);

Reduction in the free-surface of the gas volume, thus reducing the wave radiation problem;

Elimination of the external structural frame in order to accommodate floater bearings without interfering with the vacuum seal;

Operation is further explained as follows:

The device has two main gas volumes. The outer volume has an annular free-surface and hence a pressure dictated by depth. The inner volume is at partial vacuum. The cross-sectional area and pressure of the inner volume is selected to balance the buoyancy forces experienced by the floater, thus eliminating the need for additional mass.

As the floater moves downwards, the buoyancy force is reduced. However, advantageously, the compressive force exerted by the partial vacuum also reduces due to the reduction in volume of the vacuum chamber. With judicious selection of the relative areas, volumes and pressures, a well balanced system can be achieved which has the beneficial features of low mass and a tune-able spring, whilst avoiding the cost and complexity of the mechanical spring systems. The free-surface area can be reduced somewhat by utilising volume within the silo and the structural mooring leg. Furthermore, by transferring fluid and gas between compartments in the leg, the total gas volume can be controlled, thus enabling both tuning to predominant wave frequencies and compensation for tidal variation.

The invention claimed is:

1. A wave operated assembly configured to be submerged or located in a body of water, the wave operated assembly comprising:
   a wave actuated member;
   a second portion; and
   a piston assembly or pressure chamber coupled between the wave actuated member and the second portion;
   wherein:
      the wave actuated member and the second portion each define part of a first chamber or volume comprising or configured to receive a fluid comprising a gas;
      the wave actuated member is movable relative to the second portion;
      the piston assembly or pressure chamber is configured to apply a first force on the wave actuated member that works in opposition to a second force on the wave actuated member, the second force being due to the fluid in the first chamber or volume;
      the piston assembly or pressure chamber is at least partially or wholly provided within the wave actuated member; and
      an outer diameter of the piston assembly or pressure chamber comprises a continuously varying outer diameter.

2. The wave operated assembly of claim 1, wherein the first force applied to the wave actuated member by the piston assembly or pressure chamber and the second force on the wave actuated member due to the fluid in the first chamber or volume both vary with the position of the wave actuated member relative to the second portion.

3. The wave operated assembly of claim 1, wherein the piston assembly or pressure chamber is configured such that as the second force on the wave actuated member due to the fluid in the first chamber or volume respectively increases or decreases, the first force exerted by the piston assembly or pressure chamber on the wave actuated member that opposes the second force also respectively increases or decreases.

4. The wave operated assembly of claim 1, wherein the piston assembly or pressure chamber is configured to apply a force on the wave actuated member that opposes buoyancy of, and/or opposes a floating, raising or upward motion of, the wave actuated member.

5. The wave operated assembly of claim 1, wherein the piston assembly or pressure chamber is configured or configurable such that the first force exerted by the piston assembly or pressure chamber on the wave actuated member balances buoyant forces experienced by the wave actuated member and/or a floating, raising or upward motion of the wave actuated member in an equilibrium position of the wave actuated member relative to the second member, wherein the equilibrium position varies with wave height or water head or pressure on the wave operated assembly.

6. The wave operated assembly of claim 1, wherein a lower portion of the wave actuated member at least partly defines a free surface between the fluid within the first chamber or volume and the body of water.

7. The wave operated assembly of claim 6, wherein the wave actuated member is in the form of a first vessel that is inverted so as to be at least partially open at a lower or lowermost end thereof to at least partially define the free surface; the first vessel defines at least part of the first chamber or volume; and the first vessel comprises a cylindrical member having at least a top and at least one side wall, the top and the at least one side wall being sealed or integral with each other such that the first vessel is closed at an upper or upmost end and open at a lower or lowermost end.

8. The wave operated assembly of claim 7, wherein the second portion comprises or is fixed to at least one second vessel defining a part of the first chamber or volume.

9. The wave operated assembly of claim 8, wherein the at least one second vessel is open at an upper or upmost end thereof, wherein the open portion at the upper or upmost end of the at least one second vessel is within the at least one first vessel over at least some or all of the range of motion of the at least one first vessel; the free surface is defined between an outer wall or surface of the second vessel and an inner wall or surface of the first vessel; and the piston assembly or pressure chamber is coupled between and/or at least partly defined by the first vessel and the second vessel.

10. The wave operated assembly according to claim 1, wherein either:
   the first force applied by the piston assembly or pressure chamber on the wave actuated member is in the same direction as the action of gravity on the wave actuated member and the direction of a sinking or lowering motion of the wave actuated member; or
   the piston or pressure chamber is configured such that, as the wave actuated member sinks or lowers in the body of water, the volume of the piston or pressure chamber reduces and the first force applied by the piston or pressure chamber on the wave actuated member reduces.

11. The wave operated assembly according to claim 1, wherein the piston assembly or pressure chamber comprises at least a first part and a second part, the first part of the piston assembly or pressure chamber being movable relative to the second part.

12. The wave operated assembly according to claim 11, wherein:
the first part of the piston assembly or pressure chamber is fixed to, integral or coupled with the wave actuated member and/or the first vessel for movement therewith;
the second part of the piston assembly or pressure chamber is fixed to, integral or coupled with the second vessel and/or the second portion; and
the first part of the piston assembly or pressure chamber is sealed to the second part of the piston assembly or pressure chamber so that the first part, second part and seal together define a second chamber within the piston assembly or pressure chamber.

13. The wave operated assembly according to claim 12, wherein either:
the first part of the piston assembly or pressure chamber is sealed to the second part of the pressure chamber or spring by a rolling or sliding seal, a rolling membrane seal or a bellows seal; or
the piston assembly or pressure chamber is telescopic, wherein the first or second part of the piston assembly or pressure chamber is movable and/or receivable within the other of the first or second part of the piston assembly or pressure chamber.

14. The wave operated assembly according to claim 12, wherein the piston assembly or pressure chamber is at a pressure lower than the pressure of the second chamber.

15. The wave operated assembly according to claim 1, wherein:
the piston assembly or pressure chamber is at least partially or wholly provided within the wave actuated member and/or at least partially or wholly within the first and/or second vessel;
an outer surface of the piston assembly or pressure chamber defines part of the first chamber or volume; and
an outer diameter of the piston assembly or pressure chamber is less than an outer diameter of the wave actuated member and/or the first vessel.

16. The wave operated assembly according to claim 1, wherein the piston assembly or pressure chamber is concentric with the first and/or second vessel.

17. The wave operated assembly according to claim 1, wherein the wave operated apparatus comprise a motion control or tuning assembly.

18. The wave operated assembly according to claim 17, wherein the motion control or tuning assembly comprises a tuning volume enclosed within a tuning chamber, the tuning volume containing one of: a gas, a partial vacuum or vacuum, the tuning volume is at a different or higher or lower pressure than at least one of the first and/or second chambers over at least some or all of their operational ranges.

19. The wave operated assembly according to claim 18, wherein the tuning volume is comprised in a mooring or fixing portion.

20. The wave operated assembly according to claim 17, wherein the tuning volume is in communication with the first and/or second chambers via a passage, valve, choke or constriction.

21. The wave operated assembly according to claim 20, wherein the tuning volume comprises a fourth volume comprising or being configured to contain a gas, the fourth volume being in communication or selective communication with the tuning volume via a further valve, a further choke, a further constriction, pump, throttle valve or motorized valve; and the motion control or tuning assembly is configured to vary the volume and/or pressure of gas in the tuning volume and/or thereby the volume and/or pressure of gas in the first and/or second chambers by selectively operating or varying the further valve, further choke, further constriction, pump, throttle valve or motorized valve and/or selectively supplying gas from the fourth volume to the tuning volume and/or varying communication between the fourth and tuning volumes; and wherein the control or tuning assembly is adapted to receive input signals providing data relating to the state of the apparatus, such as the position, velocity, acceleration or the like of the wave activated member, and utilize this data to control the further valve, further choke, further constriction, pump, throttle valve or motorized valve accordingly.

* * * * *